Sept. 27, 1938.    O. H. JUNG ET AL    2,131,441
OILER
Filed June 6, 1935

Inventors
Oscar H. Jung &
P. E. Heffelfinger
By
Attorneys

Patented Sept. 27, 1938

2,131,441

UNITED STATES PATENT OFFICE 2,131,441

OILER

Oscar H. Jung, Wauwatosa, and Paul E. Heffelfinger, Milwaukee, Wis.

Application June 6, 1935, Serial No. 25,262

1 Claim. (Cl. 184—85)

This invention appertains to oilers, and more particularly to a novel lubricating device for the bearings of the shafts of electric motors and the like.

Considerable difficulty is encountered in the use of oil bearings of the type commonly employed on electric motors, possibly due to the small quantity of oil contained therein, and the fact that the amount of oil in the bearings cannot be seen by an observer. Consequently, these bearings frequently run dry, causing the ruination of the motor. The bearings when filled with oil also tend to feed the oil too fast, resulting in waste.

It is therefore one of the primary objects of our invention to provide an oiling device, embodying reservoirs which will hold a relatively large quantity of oil, so that the bearings will be properly lubricated over a great length of time, and in which the amount of oil in the reservoirs can be readily seen at all times.

Another salient object of our invention is the provision of novel means for feeding the oil to the bearings, in direct accordance with the need of the bearing, and the amount of use of the motor and for withdrawing surplus oil from the bearings back into the reservoir, whereby all waste of oil is eliminated.

A further object of our invention is the provision of a lubricator of the thermo capillary type, so constructed and arranged that the oil will be supplied according to the heat of the bearing and the amount of oil contained in the bearing.

A further object of our invention is the provision of a lubricating device embodying an oil reservoir formed from glass, or other transparent material, having a gooseneck for connection with the usual bearing of a shaft, a wick being employed for feeding the oil from the reservoir to the bearing by capillary attraction.

A further important object of our invention is the provision of means for arranging the oil reservoir adjacent to the bearing of the shaft, whereby the heat from the bearing and motor will be transmitted to the reservoir for maintaining the oil in a free flowing fluid condition.

A still further object of our invention is the provision of an adjustable bracket for receiving two or more of the improved reservoirs, whereby the reservoirs can be applied as a unit to the bearings of a motor, and whereby displacement of the reservoirs relative to one another will be prevented.

A still further object of our invention is to provide a thermo capillary lubricating device for electric motors of the above character, which will be durable and efficient in use, one that will be simple and easy to manufacture, and one which can be placed upon the market and incorporated with an electric motor at a small cost.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts throughout the several views, the letter M generally indicates a motor, and L our improved lubricating device therefor.

The motor M has merely been illustrated to show one use of our improved lubricator, and it is to be understood that the lubricator can be employed with various types of bearings and motors. As shown, the motor M includes the rotatable armature shaft 5 suitably supported in bearings 6 carried by the casing 7 of the motor. The bearings 6 are provided with suitable oil ports 8, through which the oil is introduced.

Figure 1:
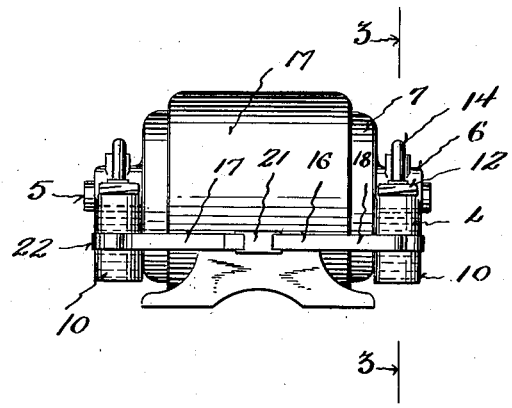
Figure 1 is a side elevation of an electric motor showing our improved lubricating device associated therewith.
Figure 2:
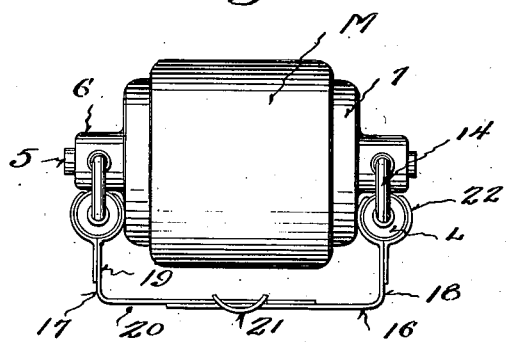
Figure 2 is a top plan view of an electric motor, showing the improved lubricating device associated therewith.
Figure 3:
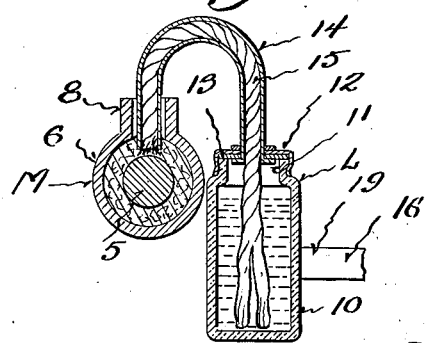
Figure 3 is an enlarged detail vertical section taken substantially on the line 3—3 of Figure 1, looking in the direction of the arrows, illustrating the association of the gooseneck with the conventional bearing of a motor.

Our improved lubricating device comprises an oil reservoir 10 for each bearing, and these reservoirs are preferably formed from glass, or other transparent material, so that the amount of oil contained therein can be readily seen, but it is to be understood the reservoir can be made from any desired material, such as metal. As shown, the reservoir can be in the nature of bottles, if so preferred, and the same are provided with threaded necks 11. Obviously, the reservoirs 10 contain a relatively large quantity of oil in comparison to the conventional motor bearings 6. The necks 11 of the reservoirs 10 are closed by threaded caps 12, and a gasket 13 is preferably interposed between the caps and the necks to form an air-tight seal. While we have shown the caps 12 threaded on the reservoir, it is to be understood that the caps can be secured in place in any desired way, and in fact the closures can be permanently secured in place at the time of filling of the reservoir. The axial centers of the caps rigidly support a conductor tube 14 of a substantially inverted U shape to form a gooseneck. The depending free ends of the tubes 14 are inserted within the oil ports 8 of the bearing 6, as clearly shown in Figure 3 of the drawing. A wick 15 is inserted in each tube, and is of sufficient length to extend into the bottoms of the oil reservoir 10. Obviously, according to the illustrated form of our invention, the reservoirs 10 can be readily filled with oil by merely removing the tubes from the bearings, and unthreading the caps 12 from the necks of the reservoirs. The flow of oil is controlled by restricting the bore of the tube 14 with more or less strands of wicking.

We prefer to rigidly connect the oil reservoirs 10 together so that the oil reservoirs for one motor can be handled as a unit, and so that displacement of the reservoirs relative to one another will be prevented. To connect the reservoirs 10 together, we may employ an adjustable bracket 16. This bracket 16 is of a substantially U shape in plan, and includes independent like companion sections 17 and 18. The sections include the inwardly directed legs 19, and the overlapping arms 20, which are adjustably connected together in any preferred manner, such as by a bowed resilient metal loop 21. The overlapping arms are slid through the slots in the resilient loop, and the resiliency of the loop frictionally holds the arms together in any preferred adjusted position. The forward ends of the legs 19 carry resilient jaws 22 for gripping and holding the oil reservoirs 10. By having the sections 17 and 18 adjustably connected together, the oil reservoirs 10 can be connected with motors of different sizes. It is also proposed to make the brackets 16 of ductile material so that the metal can be readily bent to conform to the configuration of the motor, and to extend around obstructions on the motor.

We have found that the lubricating device constructed in accordance with our invention will effectively feed the oil in proper quantities, and at the proper time, without any waste of oil. The wick feeds the oil in accordance with the dryness of the bearing, and the heat generated by the bearing and motor maintains the oil in the reservoirs in a free flowing condition, in view of the close proximity of the reservoirs to the bearing and motor. Thus, when the motor is in use, and the bearings and motor heat up, a greater quantity of oil will be supplied to the bearings.

It is to be noted that syphon action takes place, when the air and the oil in the bottle have cooled. The syphon action then operates to draw the surplus oil in the wick and bearing back into the reservoir, due to the decrease in the pressure within the bottle.

With enough strands in the tube, the oiler can be placed in the oil hole 8 vertically. But with this arrangement oil cannot be drawn back into the bottle if there is a surplus of oil in the bearing well.

We are enabled to control the size of the drops of oil fed into the bearing by varying the interior diameter of the tube 14. Thus, the larger the bore of the tube, the more wicking can be placed therein, and consequently the drop of oil will be larger than that of a tube with a very small bore.

From the foregoing description, it can be seen that we have provided a thermocapillary lubricating device of exceptionally simple and durable form, which will effectively supply the desired amount of oil to a bearing in direct accordance with the need of a bearing.

Changes in details may be made without departing from the spirit or the scope of our invention, but what we claim as new is:

A thermo capillary lubricator device for bearings comprising a pair of oil reservoirs, caps detachably associated with said reservoirs, conductor tubes carried by the reservoirs, oil feeding wicks extending through the tubes and into the reservoirs, and an adjustable bracket connecting said reservoirs together including a pair of like companion sections having a pair of inwardly directed legs, and a pair of overlapping arms, means adjustably connecting said arms together, and clamps on said legs receiving the reservoirs.

OSCAR H. JUNG.
PAUL E. HEFFELFINGER.